US010448554B2

(12) United States Patent
Gerber et al.

(10) Patent No.: US 10,448,554 B2
(45) Date of Patent: *Oct. 22, 2019

(54) ELECTRONIC CONTROL SYSTEM FOR ADJUSTING SMOOTHING TOOLS OF A HARROW

(71) Applicant: CNH Industrial America LLC, New Holland, PA (US)

(72) Inventors: Rick L. Gerber, Roanoke, IL (US); Dean A. Knobloch, Tucson, AZ (US)

(73) Assignee: CNH Industrial America LLC ( * ) Notice: Subject to any disclaimer, the term of this patent is extended or adjusted under 35 U.S.C. 154(b) by 0 days.

This patent is subject to a terminal disclaimer.

(21) Appl. No.: 15/297,684

(22) Filed: Oct. 19, 2016

(65) Prior Publication Data
US 2018/0103575 A1 Apr. 19, 2018

(51) Int. Cl.
A01B 63/32 (2006.01)
A01B 19/04 (2006.01)
(Continued)

(52) U.S. Cl.
CPC ............ A01B 63/32 (2013.01); A01B 19/04 (2013.01); A01B 19/10 (2013.01); A01B 23/02 (2013.01); A01B 49/02 (2013.01)

(58) Field of Classification Search
CPC ... A01B 19/00–08; A01B 63/30; A01B 63/28; A01B 29/048; A01B 23/043; A01B 63/32
See application file for complete search history.

(56) References Cited

U.S. PATENT DOCUMENTS 4,049,061 A 9/1977 van der Lely et al.
4,600,060 A 7/1986 Winter et al.
(Continued)

FOREIGN PATENT DOCUMENTS

EP 2633747 A1 9/2013
GB 2178283 A 2/1987
(Continued)

OTHER PUBLICATIONS

Bourgault Inustries Ltd.; Total Hydraulic Control; Aug. 23, 2016; Retrieved from web site on Aug. 23, 2016: http.//www.bourgault.com/SearchProduct/ViewProduct/tabId/168/language/en-US/Default.aspx cid=214&New=true&IsSearch=false; 1 page; US.
(Continued)

Primary Examiner — Matthew Troutman
(74) Attorney, Agent, or Firm — Rebecca L. Henkel; Rickard K. DeMille

(57) ABSTRACT

By providing an electronic control system in communication with a hydraulic system for adjusting an angle of smoothing tools of a harrow, the smoothing tools may be adjusted more quickly and on the go, including from a tractor cab, for optimum field leveling during a tilling session. The control system may include a hydraulic control valve in communication with a linear actuator. The linear actuator may be in communication with a slide bar disposed in a channel. By configuring multiple bars of a harrow to achieve an angle of rotation defined by the slide bar, the angle of rotation for smoothing tools of the harrow may be precisely controlled by the control system.

19 Claims, 6 Drawing Sheets

(51) Int. Cl.
*A01B 19/10* (2006.01)
*A01B 23/02* (2006.01)
*A01B 49/02* (2006.01)

(56) References Cited

U.S. PATENT DOCUMENTS

| | | | |
|---|---|---|---|
| 5,042,589 A | 8/1991 | Hundeby et al. | |
| 5,158,145 A | 10/1992 | Karchewski | |
| 5,622,229 A * | 4/1997 | Degelman | A01B 23/043 172/311 |
| 6,164,386 A | 12/2000 | Delaurier | |
| 6,612,381 B2 | 9/2003 | Powell et al. | |
| 6,626,246 B2 | 9/2003 | Gerber et al. | |
| 6,688,405 B2 | 2/2004 | Steinlage | |
| 6,896,068 B2 * | 5/2005 | Dietrich, Sr. | A01B 49/027 172/142 |
| 7,766,093 B2 | 8/2010 | Becker et al. | |
| 8,327,947 B2 | 12/2012 | Martindale et al. | |
| 8,657,026 B2 | 2/2014 | Friesen | |
| 9,301,439 B2 | 4/2016 | Gilstring | |
| 2002/0144826 A1* | 10/2002 | Gerber | A01B 19/02 172/142 |
| 2008/0066935 A1* | 3/2008 | Becker | A01B 63/32 172/13 |
| 2012/0298386 A1 | 11/2012 | Steffan et al. | |
| 2014/0158386 A1 | 6/2014 | Payne et al. | |
| 2014/0374128 A1 | 12/2014 | Gray et al. | |
| 2015/0053437 A1 | 2/2015 | Kovach et al. | |
| 2015/0156946 A1* | 6/2015 | Sudbrink | A01B 63/14 172/1 |
| 2016/0183446 A1 | 6/2016 | Achten et al. | |
| 2016/0234994 A1 | 8/2016 | Gray et al. | |
| 2017/0079190 A1* | 3/2017 | Steinlage | A01B 61/046 |
| 2017/0079192 A1* | 3/2017 | Steinlage | A01B 63/245 |

FOREIGN PATENT DOCUMENTS

| | | |
|---|---|---|
| WO | 2012102667 A1 | 8/2012 |
| WO | 2015190990 A1 | 12/2015 |

OTHER PUBLICATIONS

Pillar; Field Sergeant Heavy Harrow; Operators Manual; 2015; Retrieved from web-site on Aug. 23, 2016; http://www.pillarlasers.com/uploads/2015/05/Heavy%20Harrow%20Operator%20Manual%202015.pdf; pp. 1-48; US.

Degelman; Strawmaster Quick-Start Guide; Aug. 23, 2016; Retrieved from web-site on Aug. 23, 2016: http://degelman.com/assets/manuals/142638-SM7000-QS%20Guide.pdf; pp. 1-2, US.

Peter Hill; Sky's the limit for tillage tackle; Publication; Crops Jun. 21, 2014; Retrieved from ProQuest Dialog on Aug. 23, 2016: http://dialog.proquest.com/professional/docview/1560586771?accountid=157282; pp. 50, 52-53; US.

* cited by examiner

ELECTRONIC CONTROL SYSTEM FOR ADJUSTING SMOOTHING TOOLS OF A HARROW

FIELD OF THE INVENTION

The invention relates generally to tillage implements and, in particular, to an agricultural tillage implement with a soil finishing system having a multiple bar harrow supporting smoothing tools and a control system in communication with a hydraulic system for adjusting an angle of smoothing tools for use during a tilling session.

BACKGROUND OF THE INVENTION

Tillage implements such as cultivators are getting larger and more complex over time to improve tilling efficiency and seedbed characteristics. For example, cultivators are getting wider to allow tilling more soil in a single pass, which improves equipment productivity. Shanks and other components of the cultivators are also getting larger and more robust to allow increased travel speeds while tilling, which further improves equipment productivity. Further efforts have been made to improve soil leveling and other seedbed characteristics, such as by incorporating soil finishing systems which may include multiple harrows having tines for breaking up and smoothing out the surface of the soil behind main tillage tools of the tillage implements.

It is often desirable to adjust the angle at which the harrows contact the ground during a tilling session. This may be useful depending on the soil's looseness or firmness, or for achieving various effects with the soil. To adjust the angle, pins on each tine support channel of a harrow are typically removed so that they may be moved to a different angle. Then, the pins are replaced. This must be done for each harrow section of the tillage implement.

However, for a typical tillage implement having two mounting arms per harrow section, and as many as 8 harrow sections, this may require the operator to remove, adjust and replace as many as 16 pins. This can be time consuming and physically strenuous. In addition, there are typically only about three positions to choose from for each pin position for achieving various angles. This may be overly limiting in some applications in which more precise control is desired. What is needed is tillage implement having harrows which eliminate one or more of the foregoing disadvantages.

SUMMARY OF THE INVENTION

The present inventors have recognized that by providing an electronic control system in communication with a hydraulic system for adjusting an angle of smoothing tools of a harrow, the smoothing tools may be adjusted more quickly and on the go, including from a tractor cab, for optimum field leveling during a tilling session. The control system may include a hydraulic control valve in communication with a linear actuator. The linear actuator may be in communication with a slide bar disposed in a channel. By configuring multiple bars of a harrow to achieve an angle of rotation defined by the slide bar, the angle of rotation for smoothing tools of the harrow may be precisely controlled by the control system.

In one aspect, a tine angle can be adjusted using a linear actuator versus current method of a pin adjustment that manually changes the tine angle. Several components of the tine harrow assembly may be modified to incorporate the linear actuator, including adding brackets to position a linear actuator to a tine channel, and modifying a tine inner slide piece to hook onto the linear actuator. Accordingly, the linear actuator may extend or retract to control the mechanism for the tine angle.

In one aspect, the tine angle setting on a tine harrow can be hydraulically controlled from the tractor cab (on-the-go) and set for the most aggressive setting for optimum field leveling and residue flow based on current field conditions. Accordingly, cylinder force may be controlled from the tractor cab to maintain a desired tine angle setting.

The present invention may provide one or more of: (1) ease of adjustment for harrows; (2) infinite range of tine angles (versus current three position settings); (3) improved efficiency; and/or (4) improved productivity. With respect to efficiency, if it takes an operator approximately one minute per mount to adjust a current 60' tillage implement having 8 harrow sections and two mounting arms per harrow section, then the operator has used approximately 16 minutes to make an adjustment, as well as one to two minutes traveling to and from the tractor from the tillage implement. a 60' tillage implement operated at about 8 miles per hour (mph) could cover approximate 1 acre per minute. Consequently, without the invention, the operator might cover 18 less acres in a standard 10 hour day every time the operator is required to adjust the tine harrow. With respect to productivity, since it is time consuming and physically strenuous to adjust the tine harrow without the invention, the tine harrow might not be adjusted for changing conditions as may be required, which may cause reduced crop yields.

Specifically then, one aspect of the present invention may provide an agricultural tillage implement, including: a main implement frame supporting a set of ground-engaging tillage tools for tilling soil during a tilling session for seedbed preparation; and a soil finish system supported by the main implement frame for smoothing the soil tilled by the ground-engaging tillage tools, the soil finish system including: (a) a harrow supported in a trailing position with respect to the main implement frame, in which the harrow includes a harrow frame with multiple bars arranged generally transversely with respect to a travel direction of the agricultural tillage implement, in which the multiple bars support a first set of smoothing tools for smoothing the soil tilled by the ground-engaging tillage tools; and (b) a hydraulic system configured to define an angle of the first set of smoothing tools for the tilling session; and a control system in communication with the hydraulic system, in which the control system is configured to actuate the hydraulic system to define the angle of the first set of smoothing tools.

Another aspect may provide an agricultural tillage implement, including: a main implement frame supporting a set of ground-engaging tillage tools for tilling soil during a tilling session for seedbed preparation; and a soil finish system supported by the main implement frame for smoothing the soil tilled by the ground-engaging tillage tools, the soil finish system including: (a) a harrow supported in a trailing position with respect to the main implement frame, in which the harrow includes a harrow frame with multiple bars arranged generally transversely with respect to a travel direction of the agricultural tillage implement with the multiple bars of the harrow frame including a front bar arranged toward a front end of the harrow, a back bar arranged toward a back end of the harrow, and an intermediate bar arranged between the front and back bars of the harrow, in which the harrow includes a first set of smoothing tools supported by the front, back, and intermediate bars of the harrow frame for smoothing the soil tilled by the ground-engaging tillage tools; (b) a hydraulic system configured to define an angle of the first set of smoothing tools for the tilling session; and (c) a finishing tool supported in a trailing position with respect to the harrow with the finishing tool including a second set of smoothing tools for smoothing the soil tilled by the ground-engaging tillage tools; and a control system in communication with the hydraulic system, in which the control system is configured to actuate the hydraulic system to define the angle of the first set of smoothing tools.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
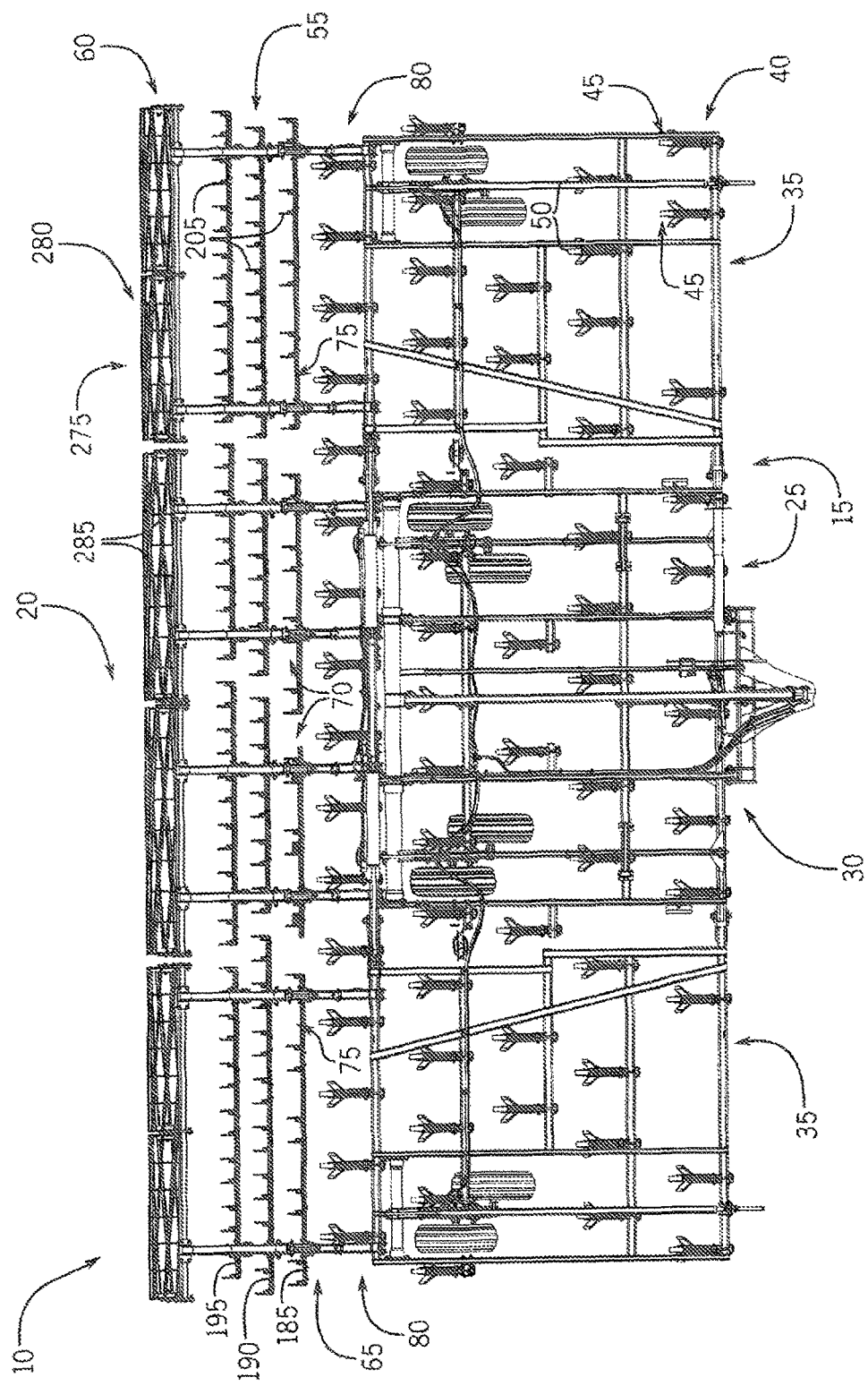
FIG. 1 is a top plan view of an agricultural tillage implement with a soil finishing system having a multiple bar harrow and linear actuator for adjusting an angle of the harrow according to the present invention.

Referring now to the drawings and specifically to FIG. 1, agricultural tillage implement 10 is towable by a tractor (not shown) or other vehicle and is shown with main tillage implement 15 and soil finishing system 20 that improves soil leveling, as explained in greater detail elsewhere herein. Main tillage implement 15 is shown here as a cultivator with main implement frame 25 that has multiple sections, represented as main frame section 30 and outer wing sections 35 on opposite sides of main frame section 30. Main implement frame 25 supports a set of ground-engaging tillage tools 40 for tilling soil during a tilling session for seedbed preparation. Tillage tools 40 are shown here as sweeps 45 mounted to shanks 50 that are attached to main implement frame 25. Although shown as sweeps 45 mounted to shanks 50, it is understood that ground-engaging tillage tools 40 may be other ground-engaging tillage tools, such as coulters, disks, and rippers.

Still referring to FIG. 1, finishing system 20 is shown with harrow 55 arranged trailing behind tillage implement 10 and finishing tool 60 arranged trailing behind harrow 55. Harrow 55 is shown as coil tine harrow 65 with multiple sections, shown as intermediate harrow sections 70 and outer harrow sections 75 on opposite sides of intermediate harrow sections 70.

Figure 2:
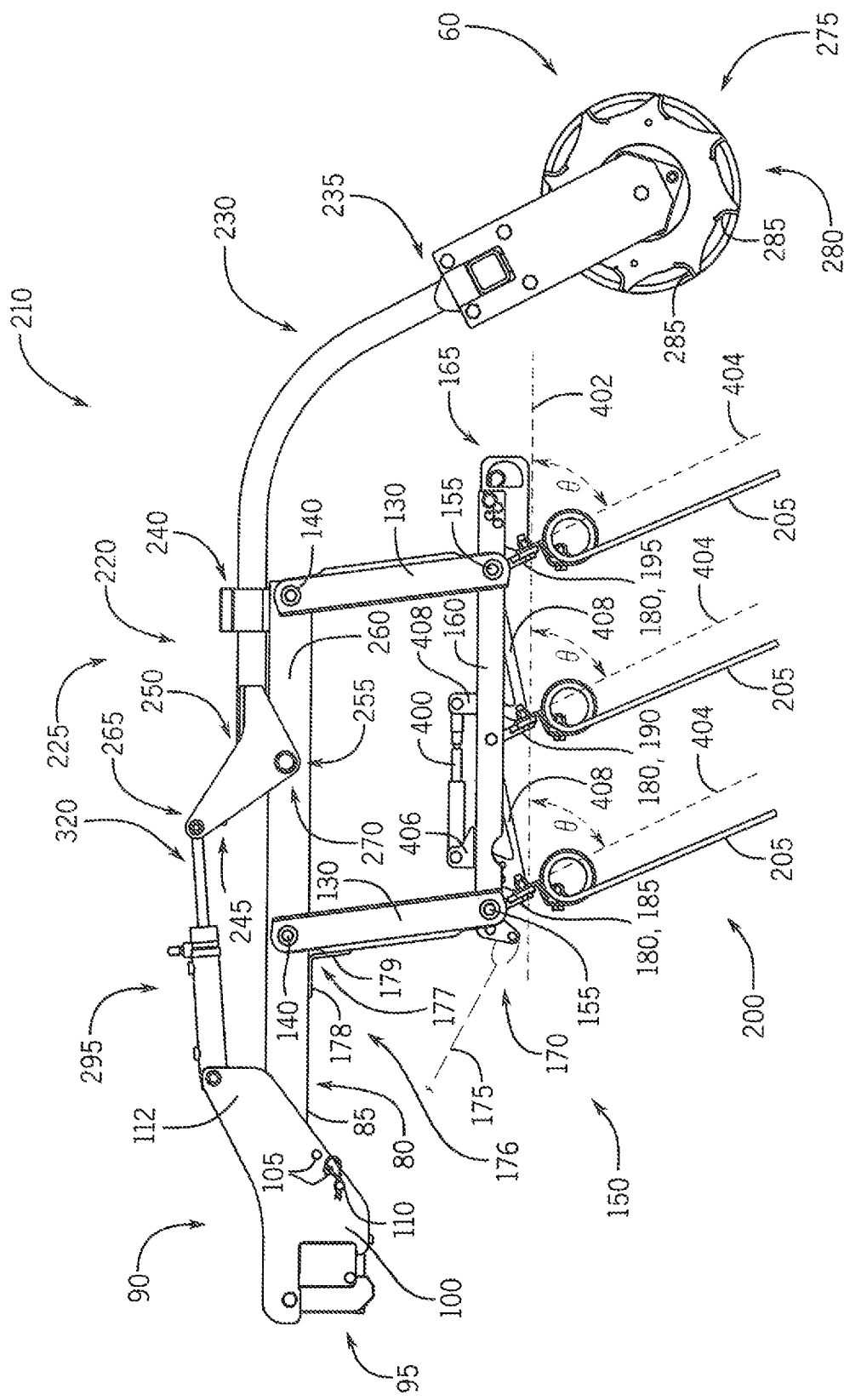
FIG. 2 is a side elevation view of the soil finishing system of FIG. 1.
Figure 3:
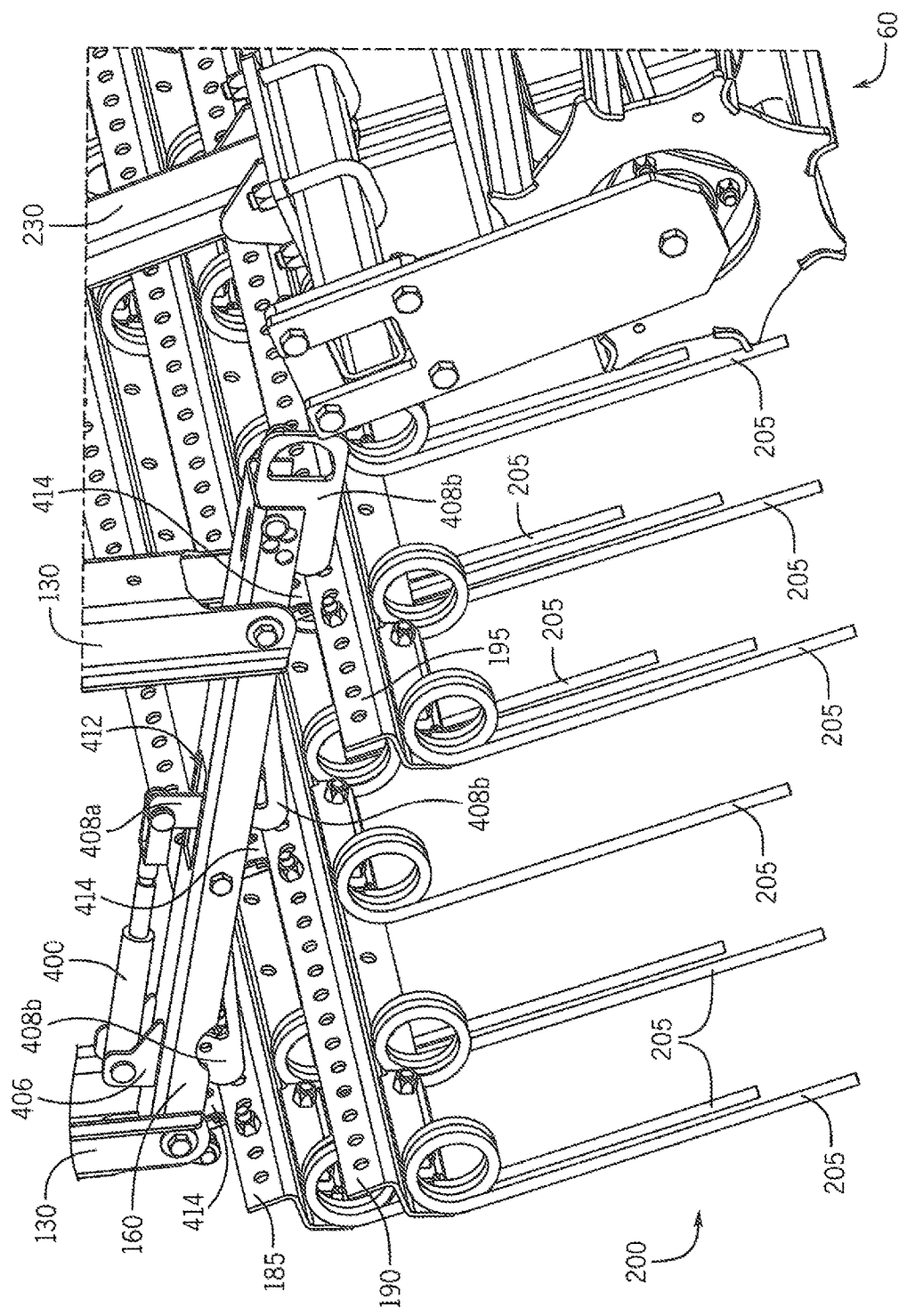
FIG. 3 is an isometric view of the linear actuator and harrow of FIG. 1.
Figure 4:
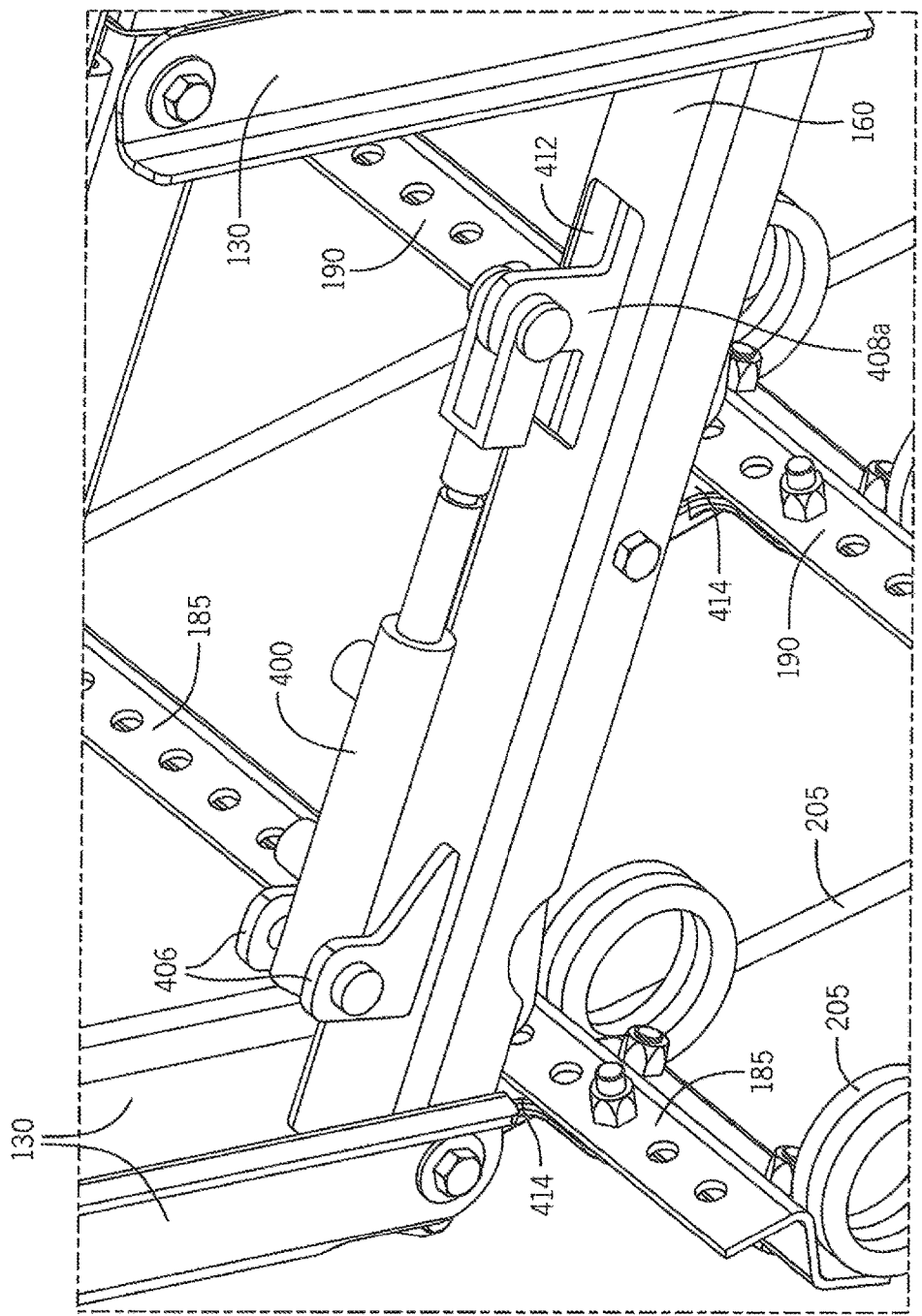
FIG. 4 is a detailed isometric view of the linear actuator and harrow of FIG. 1.
Figure 5:
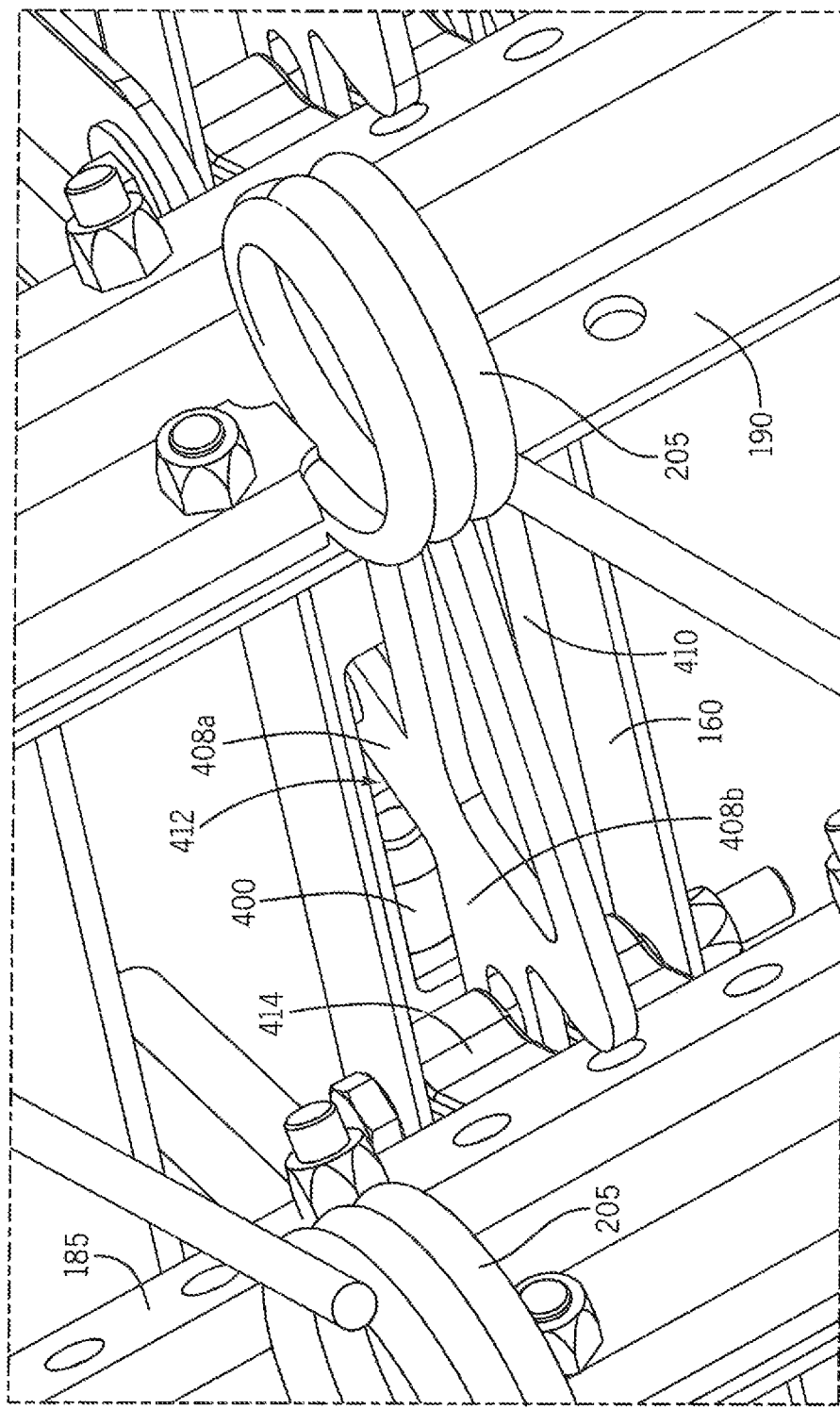
FIG. 5 is a detailed underside isometric view of the harrow of FIG. 1.

Referring now to FIG. 2, each harrow section 70, 75 (FIG. 1) includes at least one harrow arm 80 with front end 85 with bracket 90 arranged at front end 85. Bracket 90 has front section 95 that is attached to the main implement frame 25 and lower flanges 100 arranged on opposite sides of the harrow arm 80 with mounting holes 105 through which pin 110 extends. Lobes 112 extend up and rearward at an angle from bracket front section 95 and lower flanges 100 above harrow arm 80 rearward of pin 110.

Harrow arm 80 may be rectangular tubing with interconnected walls that together provide a box configuration of harrow arm 80. A pair of parallel harrow locating arms 130 provides a parallel linkage system that connects the harrow arm 80 to the rest of harrow 55. Harrow locating arms 130 may include open channel construction(s) defined by a main wall that extends transversely between a pair of side walls.

Harrow locating arms 130 have upper ends that attach to each harrow arm 80 at a corresponding pair of upper harrow locating arm pivot connections 140. Harrow locating arms 130 also have lower ends that connect each harrow arm 80 to harrow frame 150 at a corresponding pair of lower harrow locating arm pivot connections 155 at spaced-apart locations connected to a strut 160 of harrow frame 150. The back lower harrow locating arm pivot connection 155 is arranged at a back end 165 of strut 160, and the front lower harrow locating arm pivot connection 155 is arranged at a front end 170 of strut 160.

Upper and lower harrow locating arm pivot connections 140 and 155, respectively, allow the harrow frame 150 to articulate by swinging longitudinally in a back/up and forward/down direction(s) as guided by the pivoting movement of the harrow locating arms 130 with respect to the harrow arm 80 and the harrow frame 150 with respect to the harrow locating arms 130. This allows harrow 55 to define a nonuse position in which harrow frame 150 is generally freely suspended from harrow arm 80, such as when tillage implement 10 (FIG. 1) is raised to remove ground-engaging tillage tools 40 (FIG. 1) out of the soil. Harrow 55 defines an in-use position in which the harrow frame 150 swung back and up, such as when tillage implement 10 (FIG. 1) is being towed through a field and is lowered so ground-engaging tillage tools 40 (FIG. 1) engage and till the soil. During use, harrow locating arms 130 transversely locate harrow frame 150 while harrow 55 is towed by chain(s) 175 (FIG. 2) that are pulled taut while traveling and extends between and connects pin 110 (FIG. 2) in bracket(s) 90 to a front portion of harrow frame 150, such as to front end 170 of strut 160. When in the in-use position, harrow 55 is translated rearwardly with respect to the harrow arm 80, as permitted by chain(s) 175. This may move harrow frame 150 rearwardly so that intermediate bar 190 is arranged generally below locating arm pivot connection 140 of the rear locating arm 130.

Movement of harrow frame 150 may be limited in a forward direction so that the nonuse position defines a forward movement limited position. The forward movement limited position corresponds to a position at which further forward movement of harrow 150 is prevented by limiting arrangement 176, shown here as stop 177. Upper leg 178 is attached to a lower wall of harrow arm 80 and lower leg 179 extends angularly down and rearward from the upper leg 178 so the upper and lower legs 178, 179 intersect each other and define an obtuse angle. A rearward facing surface of lower leg 179 faces and engages a forward facing surface of a main wall of the front locating arm 130 when the harrow frame 150 translates forward so that that stop 177 prevents further motion of harrow frame 150 in the forward direction to define the forward movement limited position as shown in FIG. 2. Limiting arrangement 176 may be arranged so that locating arms 130 angle slightly rearward when the harrow frame 150 is in the nonuse and forward movement limited position.

Struts 160 support multiple bars 180 of harrow frame 150, with the multiple bars 180 arranged transversely across harrow 55, generally perpendicular to struts 160. Harrow 55 is shown here with a three bar configuration in which front bar 185 is arranged toward a front end of harrow 55, intermediate bar 190 arranged behind front bar 185, and a back bar 195 arranged behind both of the front and intermediate bars 185 and 190, respectively toward a back end of harrow 55. Front, intermediate, and back bars 185, 190 and 195, respectively, collectively support a first set of smoothing tools 200 that are configured to smooth the soil tilled by the ground-engaging tillage tools 40. The first set of smoothing tools 200 is represented as tines 205, shown here as spring tines. In alternative aspects, the harrow 55 may have a greater or lesser number of bars.

Tines 205 are spaced from each other and mounted to each of the front, intermediate, and back bars 185, 190, 195. Each of the tines 205 may be a multiple tine component with a pair of tine fingers that extend from spring coils at opposite sides of the tine 205 and a connecting segment that interconnects the coils and is captured by a plate arranged between the coils to mount the tine(s) 205 to a respective bar 185, 190, 195 of harrow frame 150. Different bars 185, 190, 195 may have different numbers of tines 205 mounted to them. For example, front bar 185 may have fewer tines 205 mounted to it than the number of tines 205 mounted to intermediate and/or back bars 190, 195. Tines 205 of different bars 185, 190, 195 may be staggered with respect to each other, with fingers of tines 205 of one of the bars 185, 190, 195 aligned within the gaps between adjacent fingers of tines 205 on a different bar(s) 185, 190, 195. This provides a collective drag path that substantially covers an entire width of a path tilled by main tillage implement 15 so that tines 205 of the three rows of bars 185, 190, 195 as shown can level the soil tilled by tillage tools 40.

Finishing tool arms 210 connect finishing tools 60 to harrow arms 80. Each finishing tool arm 210 may be rectangular tubing with interconnected walls that together provide a box configuration. Finishing tool arm 210 has a straight front segment 220 toward front end 225 and a curved back segment 230 that extends from front segment 220 toward back end 235. In this way, at least a portion of front segment 220 of finishing tool arm 210 overlaps a portion of the harrow arm 80 and the back segment 230 of finishing tool arm 210 extends along a curved path rearward and downward toward back end 235. A support yoke 240 extends upwardly from an upper surface of harrow arm 80 and provides a U-shaped channel in which part of the front segment 220 sits and is transversely restrained when finishing tool arm 210 is in a downward position. Each finishing tool arm 210 includes bracket 245 at front end 225, with a portion of bracket 245 overlapping a corresponding portion of the harrow arm 80. Bracket 245 has a back segment 250 from which finishing tool arm 210 extends and a lower portion 255 with a pair of lower lobes 260 that extend over and sandwich the finishing tool arm 210. A pair of upper lobes 265 extends up and forward at an angle from the lower lobes 260, above and in front of finishing tool arm front end 225. Bracket 245 is arranged to pivot with respect to the harrow arm 80, defining a finishing tool arm pivot connection 270. Finishing tool arm pivot connection 270 defines a pivot axis that extends transversely through harrow arm 80, shown with the pivot axis of finishing tool arm pivot connection 270 arranged generally above intermediate bar 190 when the harrow is in the nonuse position.

Referring again to FIG. 1, finishing tools 60 have a second set of smoothing tools 275 and are shown here as formed bar baskets 280, such as crumbler baskets, that are arranged trailing behind respective harrow sections 70, 75 (FIG. 1). The smoothing tools 275 of formed bar baskets 280 are bars 285 that at least partially define the formed bar baskets 280. Bars 285 may be flat bars, round bars, or curved bars with semicircular or curved cross-sectional shapes. Bars 285 may be spaced from each other and extending helically to collectively define a helically slotted outer circumferential surface of the formed bar baskets 280 that rolls over and further levels soil tilled by tillage tools 40 after having been previously leveled by tines 205.

Formed bar baskets 280 roll over the soil with pressure applied by down pressure system 295, which may be a hydraulic pressure system, and which may be controlled by a control system. The down pressure system 295 may be controlled to provide down pressure to finishing tool 60.

Referring now to FIGS. 2-5, a linear actuator 400, which may be a mechanical actuator, hydraulic actuator, pneumatic actuator, electro-mechanical actuator, and/or some combination thereof, may be connected to the harrow frame 150 to define an angle θ between a first plane 402, horizontal to the harrow frame 150, and second planes 404, defined by the three rows of bars 185, 190, 195, of the first set of smoothing tools 200 for a tilling session. A linear actuator 400 may be provided for each harrow section 70, 75 on the tillage implement 10. In one aspect, a first end of the linear actuator 400 may be connected to a bracket 406 mounted on an upper side of strut 160. A second end of the linear actuator 400 may be connected to an upper portion 408a of slide bar 408. As may best be seen in FIG. 5, a lower portion 408b of the slide bar 408 may be disposed in a U-shaped open channel 410 defined by a main wall that extends transversely between a pair of side walls in a lower side of strut 160. The upper portion 408a of the slide bar 408 protrudes through a slot 412 in the strut 160 for connection to the linear actuator 400, while the lower portion 408b of slide bar 408 extends along the channel 410. The strut 160 may have supports 414 for mounting the three rows of bars 185, 190, 195. As a result, the slide bar 408, in communication with the linear actuator 400 at the upper portion and the three rows of bars 185, 190, 195 at a lower portion, may be operable to define the angle θ of the first set of smoothing tools 200 by stopping a rotation of the three rows of bars 185, 190, 195, beyond a predetermined angle, by pushing or pulling the slide bar 408 via actuation of the linear actuator 400. Accordingly, the linear actuator 400, in cooperation with the slide bar 408, may allow for an infinite range of downward angles to be available for the first set of smoothing tools 200 of the harrow 55 for achieving various effects with the soil.

Figure 6:
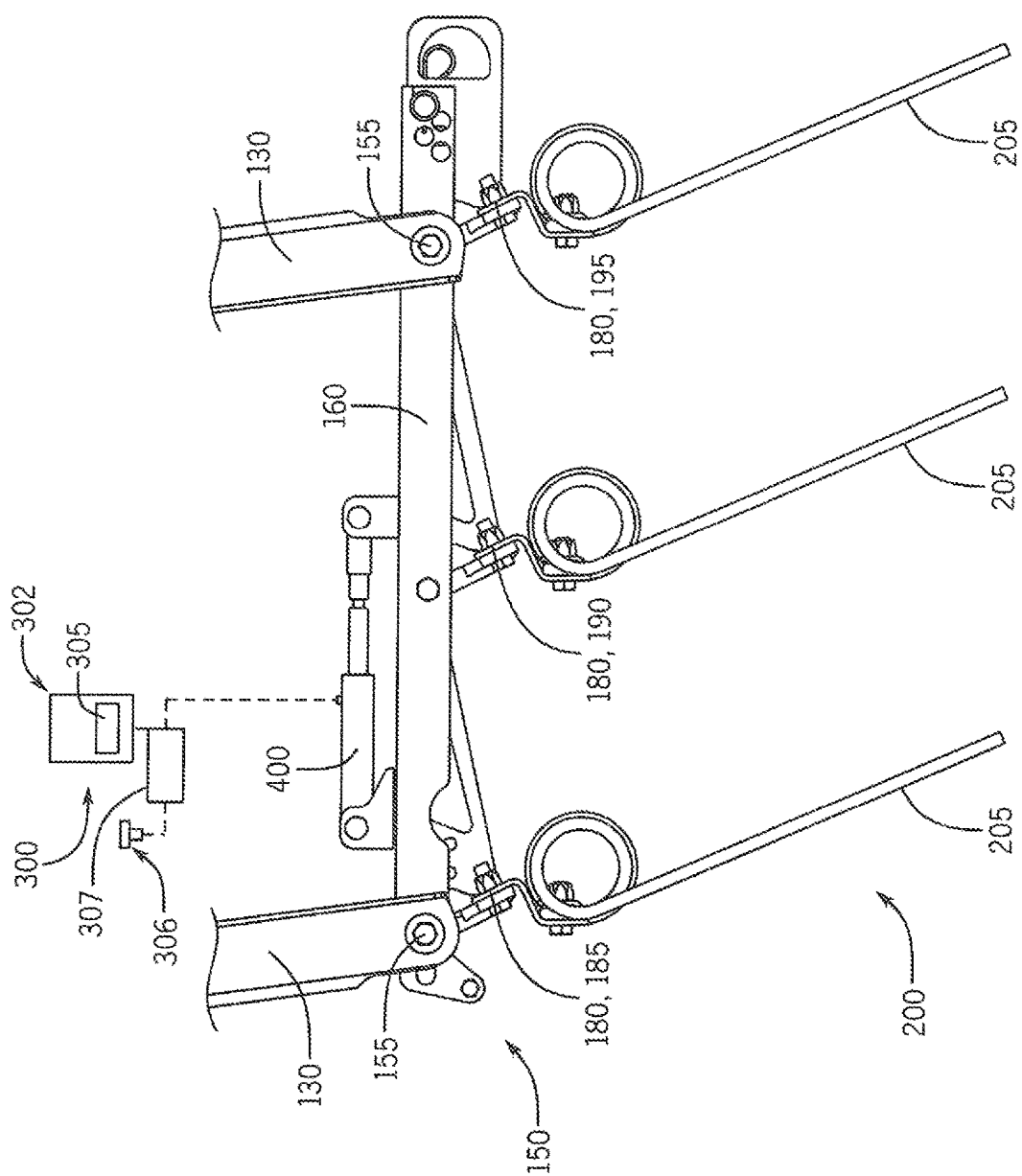
FIG. 6 is a partial side elevation view of the soil finishing system of FIG. 1 with a control system according to the present invention.

Referring now to FIG. 6, a control system 300 may include an HMI (human machine interface) configured to allow a user to control the linear actuator 400 and therefore control and adjust the angle θ of the first set of smoothing tools 200 for a tilling session. Control system 300 may include an electronic controller 302 that has at least one master controller or implement controller, shown as controller 305. Controller 305 includes a microprocessor and may be implemented as a PLC (programmable logic controller) or other industrial computer, along with corresponding software and suitable memory for storing such software and hardware including interconnecting conductors for power and signal transmission and communication for controlling electronic, electro-mechanical, pneumatic, and/or hydraulic components, including control valves, actuators, and other components, of the linear actuator 400 or other component of tillage implement 10. In one aspect, control system 300 may be implemented with mechanical controls, such as a knob 306 of a hydraulic control valve 307 in an exemplar hydraulic system, which can be manually operated to control and adjust the distance provided by linear actuator 400. The HMI and/or control knob 306 are typically mounted within a cab of the tractor that tows tillage implement 10 (FIG. 1) so the operator can adjust the angle of the first set of smoothing tools 200 from within the cab, although it is understood that they may be mounted on the tillage implement 10 (FIG. 1) itself.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An agricultural tillage implement, comprising:
   a main implement frame supporting a set of ground-engaging tillage tools for tilling soil during a tilling session for seedbed preparation;
   a soil finish system supported by the main implement frame for smoothing the soil tilled by the ground-engaging tillage tools, the soil finish system including:
   a harrow supported in a trailing position with respect to the main implement frame, the harrow including:
   a harrow arm;
   a strut pivotably connected to the harrow arm and having multiple bars pivotably connected thereto, the strut including an upper wall having a passage therethrough and defining a downwardly directed channel, wherein the multiple bars are arranged generally transversely with respect to a travel direction of the agricultural tillage implement;
   a slide bar having an upper portion extending through the passage in the upper wall of the strut and a lower portion slidably received in the channel; and
   a first set of smoothing tools connected to the multiple bars and being configured for smoothing the soil tilled by the ground-engaging tillage tools;
   a tow line operatively connecting the strut to the main implement frame, the tow line limiting movement of the harrow as the agricultural tillage implement travels during the tilling session;
   a linear actuator having a first end fixed to the upper wall and a second end interconnected to the upper portion of the slide bar; and
   a hydraulic system configured to provide a hydraulic pressure to the linear actuator connected to the slide bar, wherein linear movement of the linear actuator causes the lower portion of the slide bar to slide within the channel of the strut and pivot the multiple bars relative to the strut thereby altering an angle of the first set of smoothing tools relative to the strut to one of an infinite range of angles; and
   a control system in communication with the hydraulic system, wherein the control system is configured to actuate the hydraulic system to define the angle of the first set of smoothing tools.

2. The agricultural tillage implement of claim 1, wherein the control system includes a hydraulic control valve in communication with the linear actuator connected to the harrow.

3. The agricultural tillage implement of claim 2, wherein the control system further includes at least one of an HMI (human machine interface) and a control knob for actuating the hydraulic system.

4. The agricultural tillage implement of claim 3, wherein the at least one of an HMI and a control knob is mounted on the agricultural tillage implement.

5. The agricultural tillage implement of claim 3, wherein the at least one of an HMI and a control knob is mounted within a cab of a tractor configured to tow the agricultural tillage implement.

6. The agricultural tillage implement of claim 2, wherein the linear actuator is a hydraulic cylinder.

7. The agricultural tillage implement of claim 2, wherein the slide bar is operable to define the angle of the first set of smoothing tools by stopping a rotation of the multiple bars.

8. The agricultural tillage implement of claim 1, wherein the multiple bars of the harrow frame including a front bar arranged toward a front end of the harrow, a back bar arranged toward a back end of the harrow, and an intermediate bar arranged between the front and back bars of the harrow.

9. The agricultural tillage implement of claim 8, wherein the harrow is a spring tine harrow with each of the front, rear and intermediate bars of the harrow supporting spring tines that define the first set of smoothing tools.

10. The agricultural tillage implement of claim 9, wherein the strut supports a bracket on a first side of the strut for mounting to the linear actuator, and the strut includes a slot for connecting the linear actuator to the slide bar on a second side of the strut.

11. The agricultural tillage implement of claim 1, further comprising a finishing tool supported in a trailing position with respect to the harrow with the finishing tool including a second set of smoothing tools for smoothing the soil tilled by the ground-engaging tillage tools.

12. An agricultural tillage implement, comprising:
   a main implement frame supporting a set of ground-engaging tillage tools for tilling soil during a tilling session for seedbed preparation; and
   a soil finish system supported by the main implement frame for smoothing the soil tilled by the ground-engaging tillage tools, the soil finish system including:
   a harrow supported in a trailing position with respect to the main implement frame, the harrow including:
   a harrow arm;
   a strut pivotably connected to the harrow and having multiple bars pivotably connected thereto, the struct including an upper wall having a passage therethrough and defining a downwardly directed channel, wherein the multiple bars are arranged generally transversely with respect to a travel direction of the agricultural tillage implement and wherein the multiple bars include a front bar arranged toward a front end of the harrow, a back bar arranged toward a back end of the harrow, and an intermediate bar arranged between the front and back bars of the harrow;
   a slide bar having an upper portion extending through the passage in the upper wall of the strut and a lower portion slidably received in the channel;
   a first set of smoothing tools operatively connected to and supported by the front, back, and intermediate bars of the harrow frame for smoothing the soil tilled by the ground-engaging tillage tools;

a tow line operatively connecting the strut to the main implement frame, the tow line limiting movement of the harrow as the agricultural tillage implement travels during the tilling session;

a linear actuator having a first end fixed to the upper wall and a second end interconnected to the upper portion of the slide bar;

a hydraulic system configured to provide a hydraulic pressure to the linear actuator connected to the slide bar, wherein linear movement of the linear actuator causes the lower portion of the slide bar to slide within the channel of the strut and to pivot the multiple bars relative to the strut thereby altering an angle of the first set of smoothing tools relative to the strut to one of an infinite range of angles; and a finishing tool supported in a trailing position with respect to the harrow with the finishing tool including a second set of smoothing tools for smoothing the soil tilled by the ground-engaging tillage tools; and a control system in communication with the hydraulic system, wherein the control system is configured to actuate the hydraulic system to define the angle of the first set of smoothing tools.

13. The agricultural tillage implement of claim 12, wherein the control system includes a hydraulic control valve in communication with the linear actuator connected to the strut.

14. The agricultural tillage implement of claim 13, wherein the control system further includes at least one of an HMI (human machine interface) and a control knob for actuating the hydraulic system.

15. The agricultural tillage implement of claim 14, wherein the at least one of an HMI and a control knob is mounted on the agricultural tillage implement.

16. The agricultural tillage implement of claim 14, wherein the at least one of an HMI and a control knob is mounted within a cab of a tractor configured to tow the agricultural tillage implement.

17. The agricultural tillage implement of claim 13, wherein the linear actuator is a hydraulic cylinder.

18. The agricultural tillage implement of claim 13, wherein the harrow is a spring tine harrow with each of the front, rear and intermediate bars of the harrow supporting spring tines that define the first set of smoothing tools.

19. The agricultural tillage implement of claim 18, wherein the slide bar is operable to define the angle of the first set of smoothing tools by stopping a rotation of the multiple bars.

* * * * *